United States Patent
Chen et al.

(10) Patent No.: US 10,630,197 B2
(45) Date of Patent: Apr. 21, 2020

(54) LINE POWER EXTENSION FOR CAPACITOR SIZE REDUCTION IN AC-DC CONVERTERS

(71) Applicant: Queen's University at Kingston, Kingston (CA)

(72) Inventors: Yang Chen, Kingston (CA); Yan-Fei Liu, Kingston (CA)

(73) Assignee: Queen's University at Kingston, Kingston, ON (CA)

( * ) Notice: Subject to any disclaimer, the term of this patent is extended or adjusted under 35 U.S.C. 154(b) by 0 days.

(21) Appl. No.: 16/280,749

(22) Filed: Feb. 20, 2019

(65) Prior Publication Data

US 2019/0260303 A1    Aug. 22, 2019

Related U.S. Application Data

(60) Provisional application No. 62/632,464, filed on Feb. 20, 2018.

(51) Int. Cl.

| | |
|---|---|
| *H02M 7/217* | (2006.01) |
| *H02M 1/08* | (2006.01) |
| *H02M 7/06* | (2006.01) |
| *H02M 1/42* | (2007.01) |
| *H02M 1/14* | (2006.01) |

(52) U.S. Cl.
CPC ............. *H02M 7/217* (2013.01); *H02M 1/08* (2013.01); *H02M 1/4266* (2013.01); *H02M 7/06* (2013.01); *H02M 1/143* (2013.01)

(58) Field of Classification Search
CPC ...... H02M 1/4233; H02M 1/081; H02M 1/08; H02M 1/4208; H02M 3/07; H02M 5/4585; H02M 7/103; H02M 7/217; H02M 7/219; H02M 7/155; H02M 7/1577; H02M 7/1626; H02M 7/00
USPC .......................... 363/59–61, 84–89, 125–127
See application file for complete search history.

(56) References Cited

U.S. PATENT DOCUMENTS

| | | | |
|---|---|---|---|
| 5,818,708 A | * 10/1998 | Wong | H02M 7/2176 363/89 |
| 10,069,405 B2 | * 9/2018 | Ahmed | H02M 1/4208 |
| 2017/0317582 A1 | * 11/2017 | Leong | H02M 1/14 |

* cited by examiner

*Primary Examiner* — Nguyen Tran
(74) *Attorney, Agent, or Firm* — Stephen J. Scribner

(57) ABSTRACT

A power converter circuit includes a rectifier circuit having first and second input terminals that receive an AC input voltage and first and second output terminals that output a DC bus voltage, and a series circuit comprising a switch connected in series with an input capacitor connected across the first and second output terminals. A controller controls the switch so that the switch is on at least during a period when a magnitude of the AC input voltage is less than a selected DC bus voltage, and the switch is off during a period when the magnitude of the AC input voltage is greater than the selected DC bus voltage and less than a peak value of the AC input voltage. Power adapters incorporating these features benefit from low component count, reduced component current stress, reduced size and weight, and low cost, making then suitable for a range of portable devices such as laptop computers and cellphones.

18 Claims, 8 Drawing Sheets

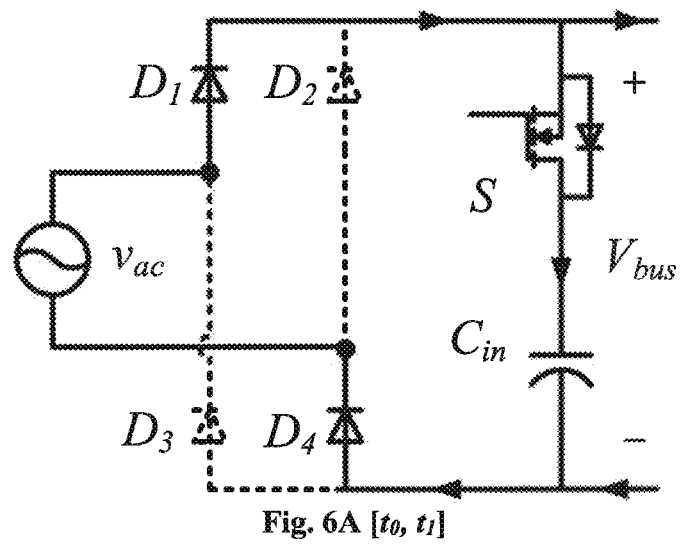
Fig. 6A [$t_0$, $t_1$]
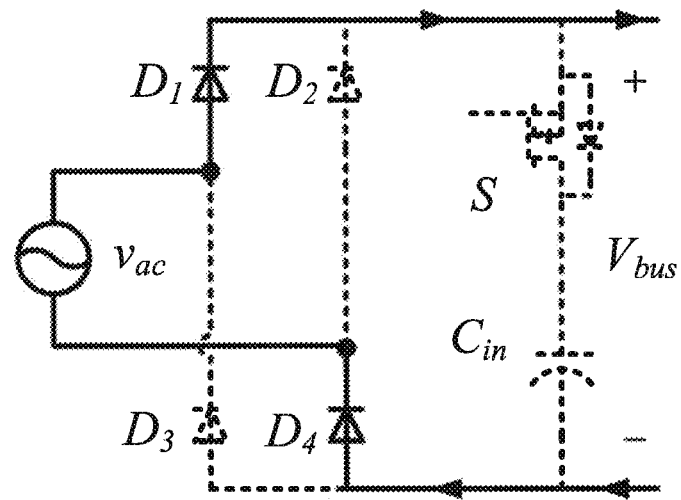
Fig. 6B [$t_1$, $t_2$]
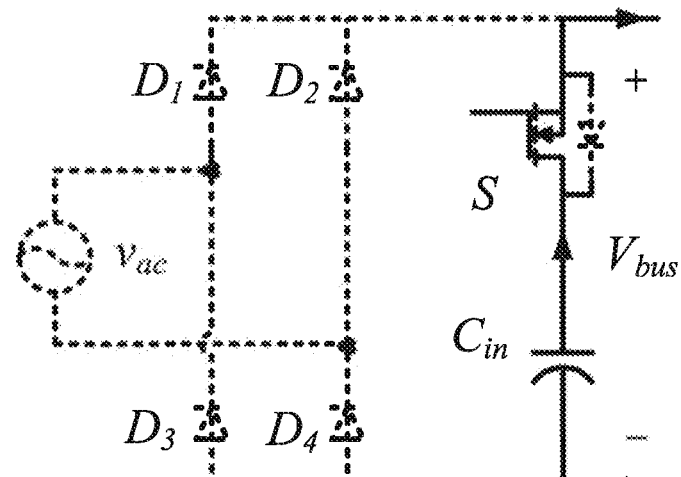
Fig. 6C [$t_2$, $t_3$]

Ch2: $V_{bus}$ (50 V/div); Ch3: $V_{ac}$ (50 V/div); Ch4: $I_{ac}$ (2 A/div)

LINE POWER EXTENSION FOR CAPACITOR SIZE REDUCTION IN AC-DC CONVERTERS

RELATED APPLICATION

This application claims the benefit of the filing date of Application No. 62/632,464, filed on 20 Feb. 2018, the contents of which are incorporated herein by reference in their entirety.

FIELD

This invention relates to AC-DC power adapters for portable electronic devices such as laptop computers and cellphones. In particular, this invention provides circuits and methods that extend the duration that the AC line provides power to the load in each line cycle, so that the size of an input capacitor can be reduced.

BACKGROUND

Technologies associated with power adapters for devices such as laptop computers and cellphones are fast advancing as new protocols and devices are unveiled. In addition to wide voltage range and high efficiency, small size is a valued feature for power adapters. With new semiconductor materials and advances in fabrication, size of semiconductors has been reduced significantly. Passive components, which may occupy more than 80% of the converter volume, however, generally cannot be reduced in size. With the recent development of USB Power Delivery, power adapters are designed for 15-60 W. At such power level, power factor correction is not mandatory. Thus, a full bridge rectifier $D_1$-$D_4$ and a buffering electrolytic capacitor $C_{in}$ as shown in FIG. 1 are often used to convert the 100-240 VAC input into DC voltage. In some compact designs, the bulk electrolytic capacitor may take as much as a quarter of the total converter volume. Thus, reducing the capacitor value and size can have significant influence on the converter size.

A prior approach to reduce the energy storage of $C_{in}$ was proposed in Published European Patent Application No. EP2750274A1. Compared to a conventional full bridge approach as shown in FIG. 1, that approach required an additional capacitor and two additional diodes, and more complex control logic, which increased cost and size of the circuit, and effectively cancelled much of the reduction in overall power converter size that was achieved by reducing the size of the input capacitor.

SUMMARY

According to one aspect of the invention there is provided a power converter circuit, comprising: a rectifier circuit having first and second input terminals that receive an AC input voltage, and first and second output terminals that output a DC bus voltage; a series circuit connected across the first and second output terminals, the series circuit comprising a switch connected in series with an input capacitor, and a controller that controls the switch so that the switch is on at least during a period when a magnitude of the AC input voltage is less than a selected DC bus voltage, and the switch is off during a period when the magnitude of the AC input voltage is greater than the selected DC bus voltage and less than a peak value of the AC input voltage.

In one embodiment the controller controls the switch so that the switch is turned off when a capacitor voltage reaches a peak value of the magnitude of the AC input voltage.

In one embodiment the controller controls the switch so that the switch is turned off at a selected time at or between a first instant when the magnitude of the AC input voltage is a peak value and a second instant when the magnitude of AC input voltage is equal to the DC bus voltage.

In one embodiment the controller controls the switch so that the switch is turned on when the magnitude of the AC line voltage decreases to the DC bus voltage.

In one embodiment the controller controls the switch so that the switch is turned off when the magnitude of the AC line voltage decreases to a selected voltage lower than a peak value of the magnitude of the AC input voltage.

In one embodiment the rectifier circuit comprises a full bridge rectifier having four diodes.

Embodiments may be for use with a DC-DC converter selected from a flyback converter, a resonant converter, a Buck converter, a Buck-boost converter, and a forward converter.

In one embodiment the power converter further comprises a DC-DC converter that receives the DC bus voltage and outputs a controlled DC voltage. The DC-DC converter may comprise a flyback converter, a resonant converter, a Buck converter, a Buck-boost converter, or a forward converter. In one embodiment the DC-DC converter comprises a flyback converter. In one embodiment the DC-DC converter comprises a resonant converter.

According to another aspect of the invention there is provided a method for implementing a power converter, comprising: providing a rectifier circuit having first and second input terminals that receive an AC input voltage, and first and second output terminals that output a DC bus voltage; connecting a series circuit across the first and second output terminals, the series circuit comprising a switch connected in series with an input capacitor; and controlling the switch so that the switch is on at least during a period when a magnitude of the AC input voltage is less than a selected DC bus voltage, and the switch is off during a period when the magnitude of the AC input voltage is greater than the selected DC bus voltage and less than a peak value of the AC input voltage.

In one embodiment the method comprises controlling the switch so that the switch is turned off when a capacitor voltage reaches a peak value of the magnitude of the AC input voltage.

In one embodiment the method comprises controlling the switch so that the switch is turned off at a selected time at or between a first instant when the magnitude of the AC input voltage is a peak value and a second instant when the magnitude of AC input voltage is equal to the DC bus voltage.

In one embodiment the method comprises controlling the switch so that the switch is turned on when the magnitude of the AC line voltage decreases to the DC bus voltage.

In one embodiment the method comprises controlling the switch so that the switch is turned off when the magnitude of the AC line voltage decreases to a selected voltage lower than a peak value of the magnitude of the AC input voltage.

In various embodiments, the method comprises using a DC-DC converter to receive the DC bus voltage and output a controlled DC voltage. In various embodiments, the DC-DC converter comprises a flyback converter, a resonant converter, a Buck converter, a Buck-boost converter, or a forward converter.

BRIEF DESCRIPTION OF THE DRAWINGS

For a greater understanding of the invention, and to show more clearly how it may be carried into effect, embodiments will be described, by way of example, with reference to the accompanying drawings, wherein:

FIGS. 6A-6C are schematic diagrams showing operation of the circuit of FIG. 4B during three time intervals, wherein dashed lines show parts of the circuit that are not in operation during each interval.

DETAILED DESCRIPTION OF EMBODIMENTS

Figure 4A:
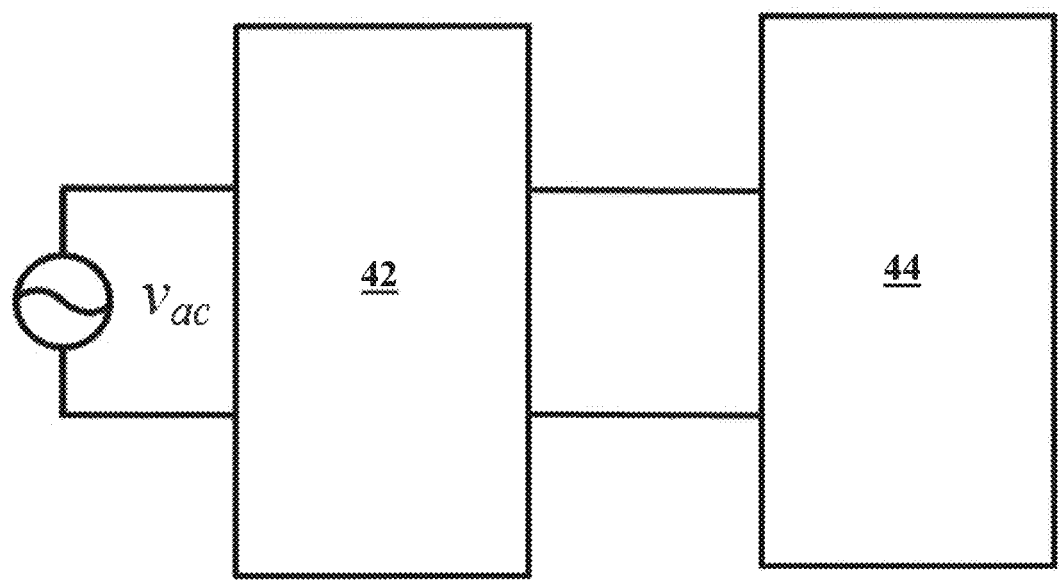
FIG. 4A is a diagram showing a power adapter connected to a portable electronic device, according to one embodiment.

According to one aspect, the invention provides methods and circuits for reducing the value and size of an input electrolytic capacitor $C_{in}$ of an AC-DC converter, by extending the duration that the AC line provides power to the load in each line cycle. According to embodiments, which may be referred to herein as line power extension circuits, the input capacitor energy is used only when the AC voltage is below a selected level. Capacitor discharging is controlled by an auxiliary switch, while capacitor charging is not changed relative to a conventional circuit. As described herein, line power extension circuits and methods may reduce the input capacitor value and size significantly, relative to conventional circuits, e.g., a reduction of 33% in an embodiment operating at 60 W output power. Alternatively, when a capacitor value according to a conventional design is used, the DC bus voltage range and the current stress may be reduced, from which the design of a following stage (e.g., a DC-DC converter) may benefit. Embodiments are described in detail below with respect to a full bridge rectifier that converts an AC voltage to a DC voltage (e.g., FIG. 4B). The output of the rectifier is a DC voltage with voltage ripple dependent on the capacitor value and the output power. A subsequent DC-DC converter stage may be used to convert the DC voltage into a controlled DC voltage level (e.g., FIG. 4C). For example, a flyback converter, a resonant converter, a forward converter, a Buck converter, a Buck-boost converter, etc., may be used as the DC-DC converter. Advantageously, in the embodiments $C_{in}$ functions as both an output capacitor of the line power extension circuit and as an input capacitor of a subsequent DC-DC converter stage. Thus, the need for an additional input capacitor for the subsequent stage is avoided, which reduces size and cost of the AC-DC converter. Further, in the embodiments $C_{in}$ is not connected directly across the input terminals of the subsequent DC-DC converter stage, and no further capacitors are connected in parallel, thereby avoiding any possible current spike when the auxiliary switch is activated and the need for a current limiting inductor. In implementations such as that shown in FIG. 4A, it will be appreciated that a power adapter 42 incorporating an embodiment as described herein benefits from low component count, reduced component current stress, reduced size and weight, and low cost, making them suitable for a range of portable devices 44 such as laptop computers and cellphones.

Figure 1:
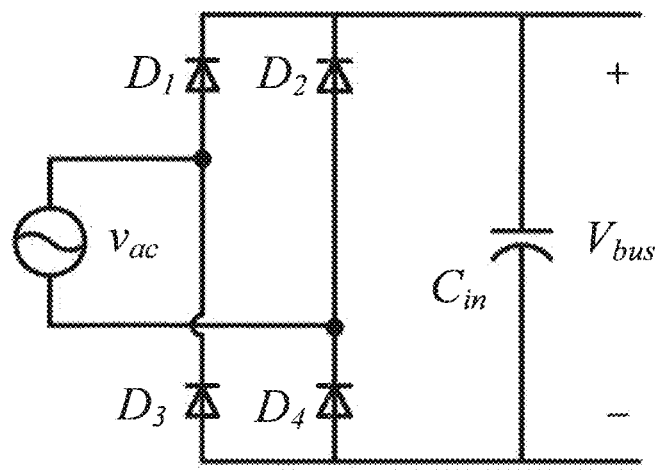
FIG. 1 is a schematic diagram of a conventional full bridge rectifier circuit without power factor correction, according to the prior art.
Figure 2:
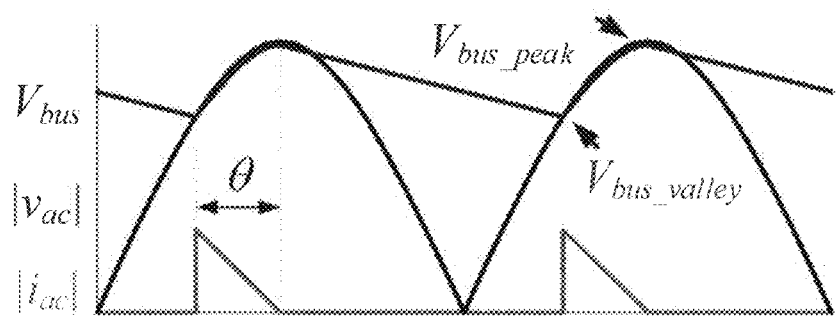
FIG. 2 is a diagram showing the full bridge rectifier conduction waveform for the circuit of FIG. 1.

Capacitor Buffering A conventional full bridge rectifier circuit without power factor correction is shown in FIG. 1, and FIG. 2 shows the voltage and current waveforms. In FIG. 2, $|v_{ac}|$ is the absolute value of the AC line voltage, $V_{bus}$ is the voltage on the input capacitor $C_{in}$, $i_{ac}$ is the input current from the AC line, and θ is the conduction angle. $V_{bus\_peak}$ refers to the peak value of a specific AC voltage. For example, for 120 VAC, $V_{bus\_peak}$ is 120 V*1.414=170 V; for 220 VAC, $V_{bus\_peak}$ is 220 V*1.414=310 V. $V_{bus\_max}$ refers to the absolute maximum value of all input AC voltages covering the range of 100-240 VAC, in other words, $V_{bus\_max}$ is one fixed value of 240 V*1.414=340 V. The same applies to $V_{bus\_valley}$ and $V_{bus\_min}$ (see FIG. 5). As an example, $V_{bus}$ is the bus voltage for a following DC-DC converter stage.

When $V_{bus}$ is lower than the line voltage, the capacitor will be charged until it equals the peak line voltage. After that, $C_{in}$ will be discharged to power the load until its voltage is lower than the line voltage in the next half line cycle.

At a given AC voltage, the relationship between $V_{bus\_peak}$ and $V_{bus\_valley}$ is determined by (1), in which $P_o$ is the output power and Δt is the discharging time of $C_{in}$.

$$\frac{1}{2}C_{in}(V_{bus\_valley}^2 - V_{bus\_peak}^2) = P_o \cdot \Delta t \quad (1)$$

Δt may be found using equation (2), in which $f_{line}$ is the AC line frequency. The conduction angle θ is given in equation (3).

$$\Delta t = \frac{\pi - \theta}{2\pi f_{line}} \quad (2)$$

$$\theta = \cos^{-1}\left(\frac{V_{bus\_valley}}{V_{bus\_peak}}\right) \quad (3)$$

Figure 3:
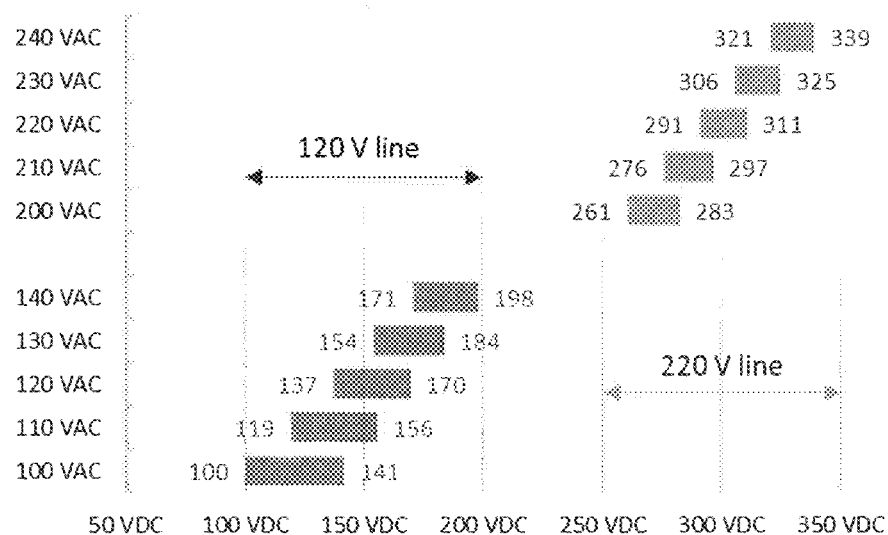
FIG. 3 is a plot showing DC voltage on $C_{in}$=100 μF for different AC input voltages (VAC rms) and 60 W load power, for the circuit of FIG. 1.

If the capacitor value is large enough so that the voltage drop (i.e., $V_{bus\_peak}-V_{bus\_valley}$) can be neglected, then the capacitor discharging time is approximately $½f_{line}$. Based on this assumption, the DC voltage range on $C_{in}$ at different AC voltages may be calculated. For example, FIG. 3 shows the DC voltages on a 100 µF capacitor for 60 W power at different AC voltages from 100-240 VAC. As one example, when the input voltage VAC is about 100 Vrms, the DC voltage across the 100 uF capacitor will vary from about 100 to 141 VDC. When the input voltage VAC is 200 Vrms, the DC voltage across the 100 uF capacitor will vary from about 261 to 283 VDC.

As shown in FIG. 3, for universal AC input from 100-240 VAC, the maximum $C_{in}$ voltage $V_{bus\_max}$ is about 340 V, which is the peak voltage at 240 VAC (i.e., 240 V×1.414=339.34 V). On the other hand, the minimum $C_{in}$ voltage $V_{bus\_min}$ is determined by the valley voltage point at 100 VAC. For a given power level, $V_{bus\_min}$ varies for different $C_{in}$ values. In this case, with 60 W load and $C_{in}$ = 100 µF, $V_{bus\_min}$ is 100 VDC, at which the converter has maximum current stresses.

For 100 VAC, if the minimum DC voltage $V_{bus\_min}$ is chosen as 100 V, the conduction angle θ (as shown in FIG. 2) is only 45° in a half line cycle (i.e., 25% of the cycle period). The input capacitor provides the power for the remaining 135° of the half line cycle (i.e., 75% of the cycle period). Accordingly, the input capacitor must be of a large value, which translates to a large physical size.

According to one aspect of the invention, drawbacks of the conventional full bridge approach described above are overcome by extending the time that the AC line voltage is used to power the load. When the AC line provides more power to the load, the input capacitor does not need to store as much energy as in the conventional full bridge case. As a result, the capacitor value can be reduced while achieving same bus voltage range.

Referring to the conventional circuit of FIG. 2, it is noted that the AC line provides power only before the peak voltage, even though after that the line voltage is still higher than the $V_{bus\_min}$. However, according to embodiments of the invention, the interval after the peak point (i.e., after $V_{bus\_peak}$) until $V_{bus\_min}$ is also used, increasing the conduction angle θ. A controller controls the extent to which the conduction angle is increased. In some embodiments, θ is doubled, relative to the conventional case. Effectively, the capacitor discharging time is reduced. Thus, the required capacitor value can be reduced to achieve the same $V_{bus\_min}$. Alternatively, with the same capacitor value as in a conventional design, $V_{bus\_min}$ can be increased. In applications where a subsequent DC-DC converter stage is used, the voltage gain requirement for the DC-DC stage is reduced, which also reduces the current stress. These features translate into an efficiency improvement or an overall reduction in size of the converter.

Figure 4B:
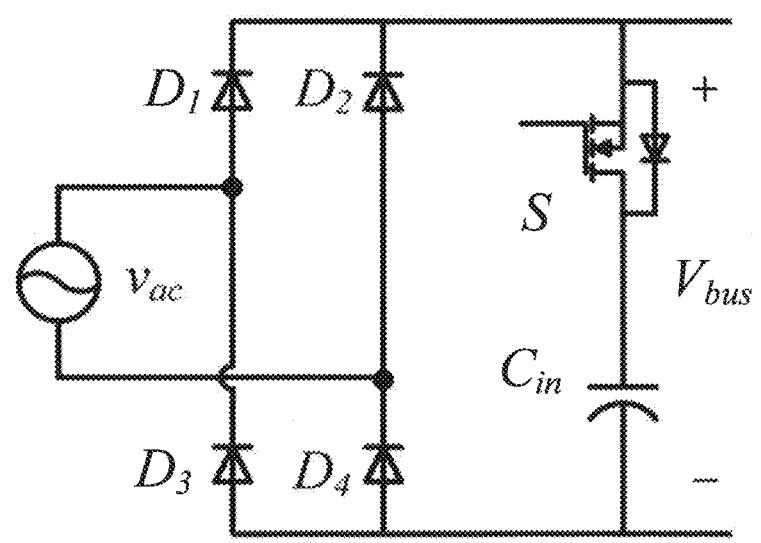
FIG. 4B is a diagram showing a line power extension circuit, according to one embodiment.
Figure 4C:
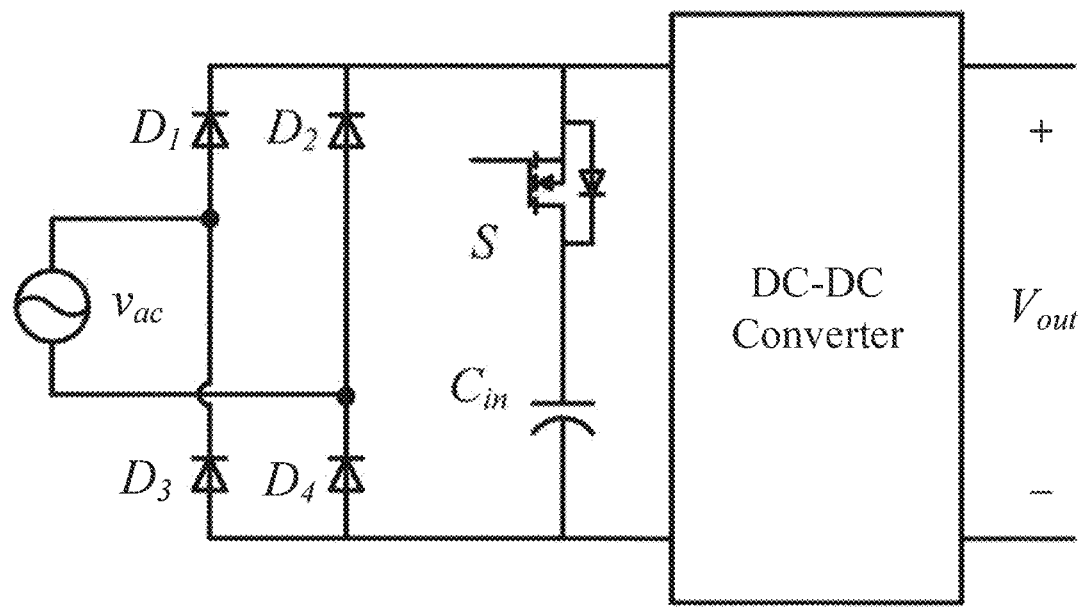
FIG. 4C is a diagram showing a line power extension circuit with a subsequent DC-DC converter stage, according to one embodiment.

FIG. 4B shows an embodiment, referred to herein as a line power extension circuit, including a full bridge rectifier circuit rectifier $D_1$-$D_4$ and switch S connected in series with capacitor $C_{in}$. S is connected in such a way that the current through the body diode will charge the capacitor $C_{in}$. Thus, regardless of the state of S, $C_{in}$ is always charging when the line voltage is higher than the capacitor voltage. $C_{in}$ is discharged only when S is turned on.

Figure 5:
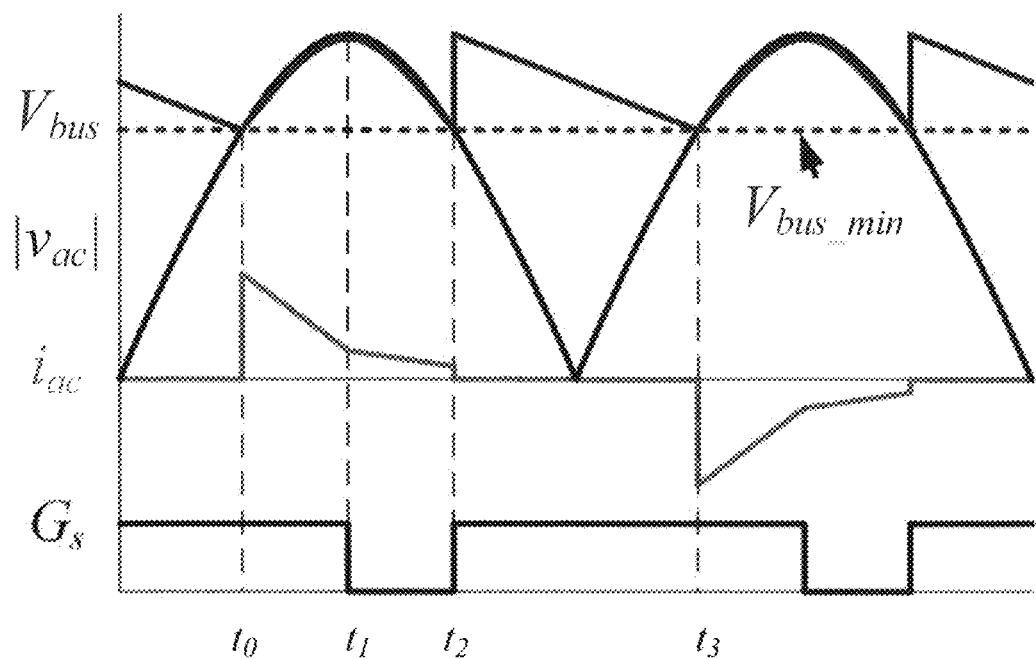
FIG. 5 is a diagram showing key waveforms for the circuit of FIG. 4B.

FIG. 5 shows key waveforms of the embodiment of FIG. 4B. In FIG. 5, $V_{bus}$ is the output voltage of the line power extension circuit, as well as the input voltage for a subsequent stage (e.g., a DC-DC converter stage). $|v_{ac}|$ is the absolute value of the AC input, $i_{ac}$ is the AC input current, and $G_s$ is the gate signal of the switch S. FIGS. 6A-6C show three states A, B, and C of operation of the embodiment during the positive half line cycle, wherein dashed lines show parts of the circuit that are not in operation. Operation during the negative half cycle is similar to that shown in FIGS. 6A-6C.

State A [$t_0$, $t_1$]: $D_1$ and $D_4$ start to conduct at $t_0$, at which time $v_{ac}$ equals $V_{bus}$. From $t_0$ to $t_1$, the capacitor voltage increases with $v_{ac}$. During this time, S is turned on, in order to reduce conduction loss. In an ideal case, S is turned off at $t_1$, at which time the capacitor voltage reaches the peak value. However, in practice, S may be turned off at a selected time between $t_0$ and $t_1$ to achieve optimal performance. The capacitor continues to be charged through the body diode of S to the peak line voltage.

State B [$t_1$, $t_2$]: At $t_1$, the input AC voltage reaches peak value and the capacitor $C_{in}$ is also charged to peak value. After $t_1$, the AC voltage will be lower than the peak value. As S turns off at $t_1$, the capacitor is disconnected from the load, thus the capacitor voltage remains as the peak line voltage. The load is powered by the AC line directly during $t_1$ to $t_2$, and the AC current is the AC voltage divided by the load resistance. Due to this extended conduction time, $i_{ac}$ is lower than the conventional full bridge. During $t_1$ to $t_2$, the body diode of S is reverse-biased. The peak voltage stress on S is reached at $t_2$, and is equal to $V_{bus\_max}$-$V_{bus\_min}$. Generally, in embodiments operating with input voltage of 100-240 VAC, the voltage stress is below 100 V. It is noted that the switch S is operated (i.e., turn-on and turn-off) when the input AC voltage is low. The voltage stress on S is the difference between the peak AC voltage (e.g., 141 V for 100 Vrms AC input) and the $V_{bus\_min}$ (e.g., 100 V). In this example, the voltage stress is 41 V (141-100 V). When the input AC voltage is high, the switch S is always turned on. Therefore, a switch such as a MOSFET with voltage rating of 100 V may be used for S.

State C [$t_2$, $t_3$]: After $t_2$, $v_{ac}$ reduces below the designed $V_{bus\_min}$. S is turned on at $t_2$, so that the capacitor energy is used. As the capacitor voltage is maintained at the peak line voltage, $D_1$ and $D_4$ will be reverse-biased after $t_2$. The capacitor voltage will decrease until it is equal to $v_{ac}$. In this case, the capacitor value is selected such that the minimum capacitor voltage at $t_3$ is equal to the line voltage at $t_2$, both at $V_{bus\_min}$.

Controller

Figure 7:
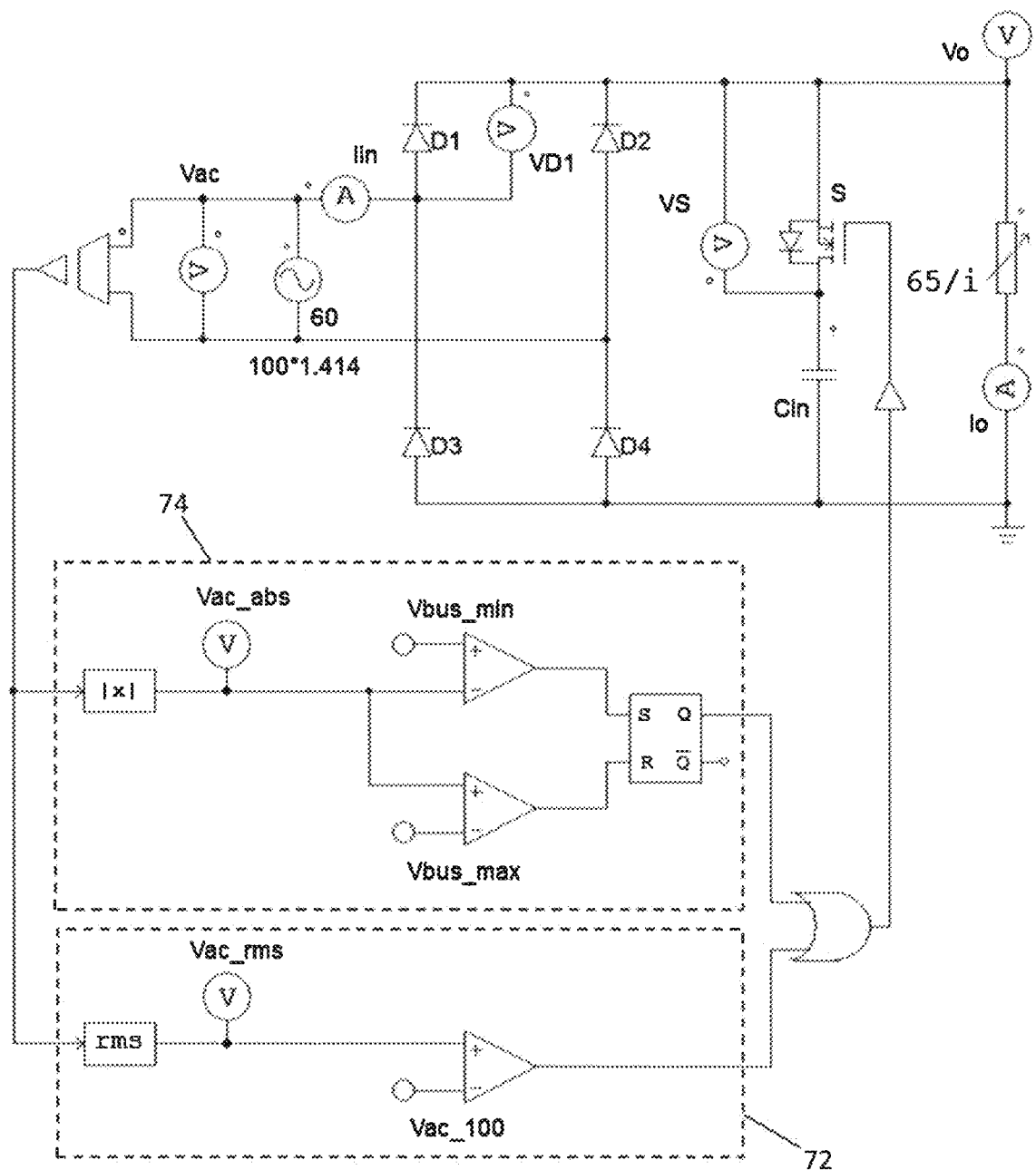
FIG. 7 is a circuit diagram showing a controller implemented for a line power extension circuit, according to one embodiment.

An embodiment including a controller is shown in FIG. 7. In this embodiment the controller includes a circuit 72 used to determine the operation mode of the control circuit, i.e., whether line power extension is needed (i.e., activated, the switch is off). Line power extension control is activated when the magnitude of the AC voltage is low, i.e., below $V_{bus\_min}$; for example, 100 VAC. For normal operation at, e.g., 120 VAC, the bus voltage should always be higher than the designed $V_{bus\_min}$. Thus, there is no need to activate line power extension and the switch remains on, and the circuit operates substantially equivalent to a conventional full bridge rectifier.

The controller also includes a circuit 74 used to determine on/off timing of the switch S. In an ideal case, S should be turned off at the line voltage peak (i.e., $V_{bus\_peak}$) after which the line will power the load directly. The turn-on timing of S is when the magnitude of the line voltage decreases to a designed $V_{bus\_min}$.

Performance Comparison

Figure 8:
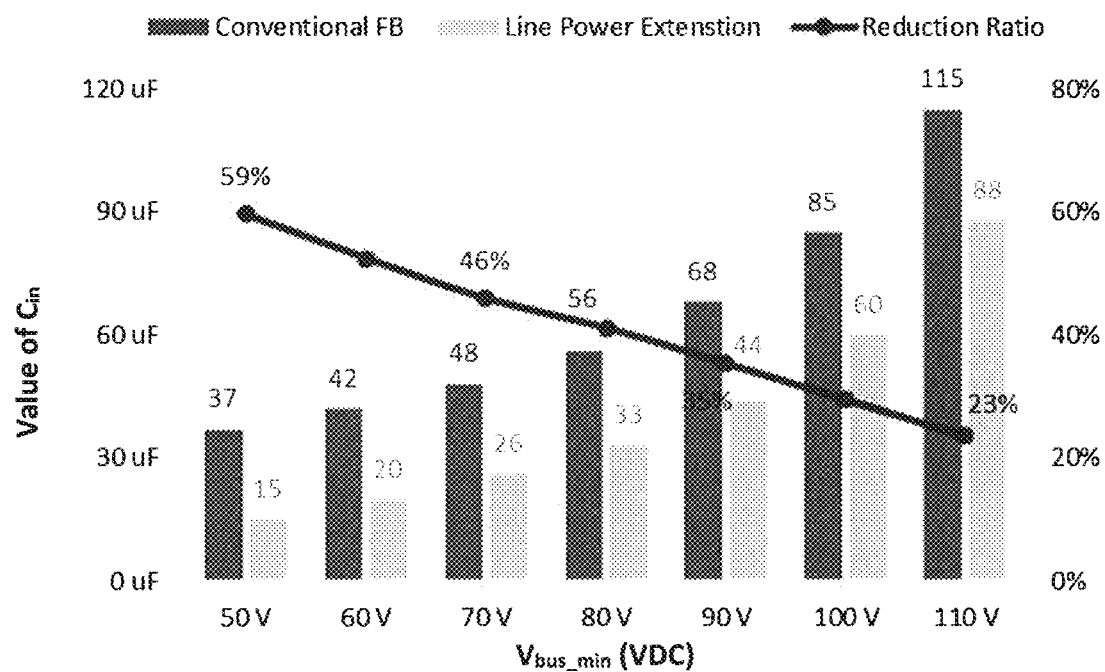
FIG. 8 shows the results of a simulation comparing the value of $C_{in}$ required for different $V_{bus\_min}$ voltages, for a conventional full bridge and a line power extension circuit according to one embodiment.

A simulation was conducted using PSIM (Powersim Inc., Rockville, Md., USA) to determine the required capacitance value of $C_{in}$ for a line power extension embodiment and a conventional full bridge, for designs based on different $V_{bus\_min}$ and a 60 W load. FIG. 8 shows simulation results.

As shown in FIG. 8, when $V_{bus\_min}$ is set at 50 V, then a 37 µF capacitance should be used for a conventional full bridge diode rectifier, while only 15 µF is needed for a line power extension embodiment. Thus, a 59% capacitor reduction is achieved for a 50 V design. The capacitor reduction ratio, shown by the solid line in FIG. 8, decreases as $V_{bus\_min}$ increases, as the AC power conduction angle is reduced. In practice, a typical $V_{bus\_min}$ design is 90-100 V, at which the capacitance can be reduced by about 33% with line power extension as described herein, relative to a conventional full bridge diode rectifier.

Figure 9:
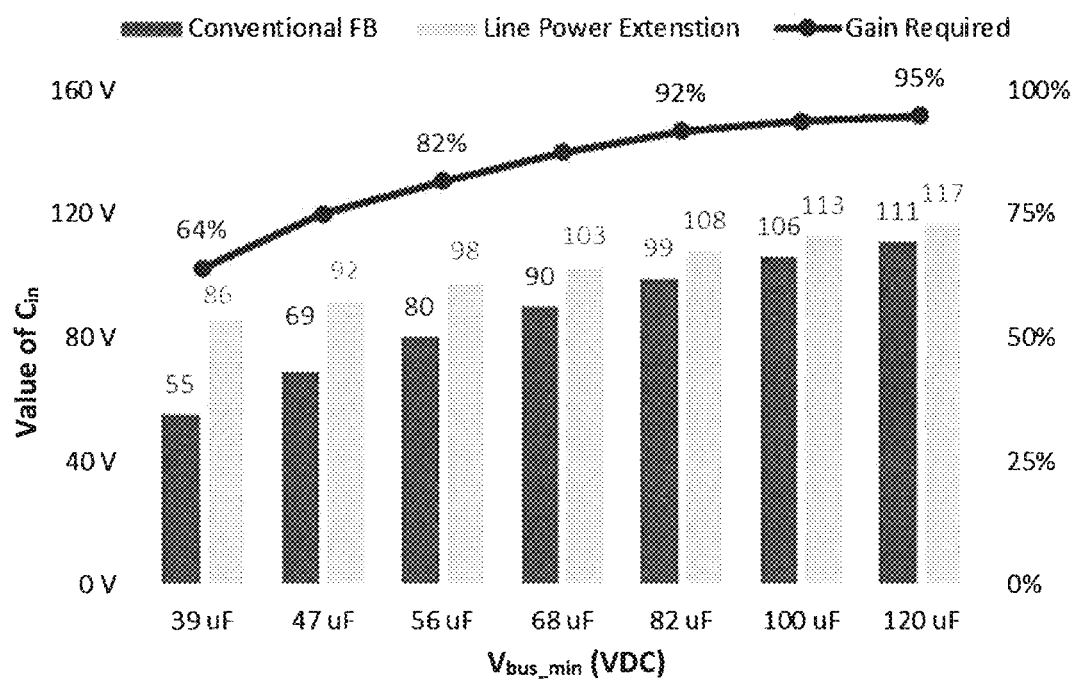
FIG. 9 shows the results of a simulation comparing $V_{bus\_min}$ at different values of $C_{in}$, and the gain required for a subsequent converter stage, for a conventional full bridge and a line power extension circuit according to one embodiment.

When a line power extension embodiment is implemented with the same capacitance as a conventional full bridge diode rectifier, then $V_{bus\_min}$ can be increased to relieve the wide voltage gain requirement for a following DC-DC converter stage. FIG. 9 shows the results of a simulation comparing the minimum bus voltage between a conventional full bridge circuit and a line power extension circuit for different $C_{in}$ values. As shown in FIG. 9, in an extreme case where a 39 µF capacitor used, then $V_{bus\_min}$ for the full bridge is only 55 V, while that for the line power extension circuit is 86 V. When $V_{bus\_max}$ is 340 V, the normalized voltage gain requirement is reduced from 6.2 to 4 (i.e., 340 V/55 V=6.2; 340 V/86 V=4). That is, the voltage gain requirement for a subsequent DC-DC converter is reduced to only 64% (4/6.2=64%) of that in the conventional full bridge. As shown in FIG. 9, as the value of $C_{in}$ increases, the difference in $V_{bus\_min}$ decreases (due to the conduction angle decreasing), thus the line power extension circuit produces less reduction in the required voltage gain.

In a practical case, if an 82 µF capacitor is used, then $V_{bus\_min}$ can be increased from 99 V in a conventional full bridge to 108 V with the line power extension circuit, which is an ~10% improvement. For a following DC-DC converter, e.g., a series resonant converter, this 10% voltage improvement indicates the same amount of current stress reduction. Then, the conduction loss can be reduced to only ~80% (=$0.9^2$) of that in the conventional full bridge case.

Figure 10:
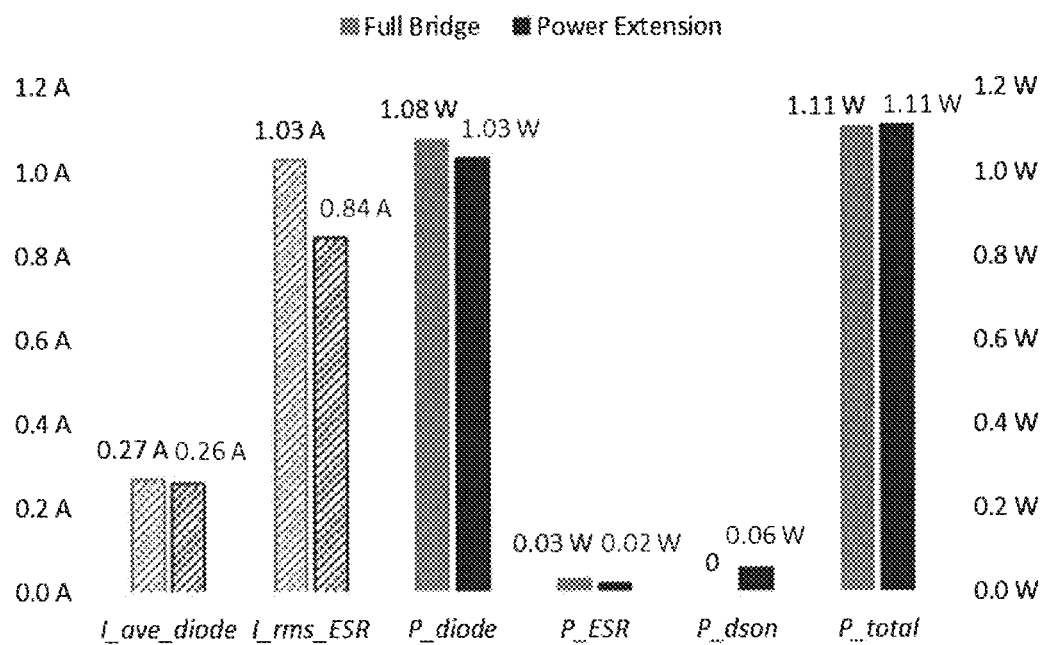
FIG. 10 shows the results of a simulation comparing current and loss of a conventional full bridge rectifier and a line power extension embodiment.

Besides a significant current reduction for the following DC-DC converter, current stress in the input rectifiers is also reduced with a line power extension circuit as described herein. FIG. 10 shows the results of a simulation comparing current stress and loss of a conventional full bridge rectifier and a line power extension circuit. In FIG. 10, I_ave_diode: average current in diodes D1-D4; I_rms_ESR: RMS current in $C_{in}$; P_diode: power loss diodes D1-D4; P_ESR: power loss in $C_{in}$; P_dson: conduction loss in switch S; P_total: total power loss. In this example the diode loss was calculated based on 0.95 V forward voltage drop for a bridge rectifier (e.g., Micro Commercial Components, Part No. LB6S), while the MOSFET conduction loss P_dson d n was calculated based on $R_{dson}$ of 85 mOhms (e.g., STMicroelectronics, Part No. STF43N60DM2). It can be observed that the diode bridge has significantly higher loss as compared to the additional switch. The extra loss created by the additional switch can be compensated by the reduced current stress in the diode bridge, so that the total loss P_total in the conventional circuit and the line power extension circuit are same in this example. However, if the losses in the EMI filter are also considered, then the line power extension circuit reduces the total loss.

WORKING EXAMPLE

A 60 W prototype was built according to the circuit of FIG. 4B and the parameters shown in Table 1. For $C_{in}$, a total of 60 µF (56 µF electrolytic+4.7 µF ceramic) capacitance is needed to maintain $V_{but\_min}$ at 100 VDC for 100 VAC. As a comparison, 85 µF (82 µF electrolytic+3.3 µF ceramic) should be used to achieve same input voltage range.

TABLE 1

| Design parameters. | |
| --- | --- |
| Input AC voltage | 100-240 VAC |
| Operation of Line Power Extension | 100 VAC |
| Operation as Full Bridge | 110-240 VAC |
| Output Power | 60 W |
| Input Capacitor $C_{in}$ | 56 µF (electrolytic) + 4.7 µF (ceramic) |
| Minimum Bus Voltage $V_{bus\_min}$ | 100 VDC |
| Auxiliary MOSFET | $R_{dson}$ = 85 mOhms e.g., STMicroelectronics, Part No. STF43N60DM2) |
| Diode Bridges | Forward voltage drop = 0.95 V (e.g., Micro Commercial Components, Part No. LB6S) |
| Controller | dsPIC33FJ06GS101A (e.g., Microchip Technology Inc.) |
| Auxiliary MOSFET Driver | PC817 (e.g., Sharp/Socle Technology) |

The sizes of 56 F and 82 µF electrolytic capacitors (Rubycon BXW series) were compared. Both capacitors had the same diameter of 16 mm. The length of the 56 µF capacitor was 21 mm, while that of the 82 µF capacitor was 31 mm. Thus, a 30% (1-21/31=30%) capacitor size reduction was achieved with the line power extension circuit.

Figure 11:
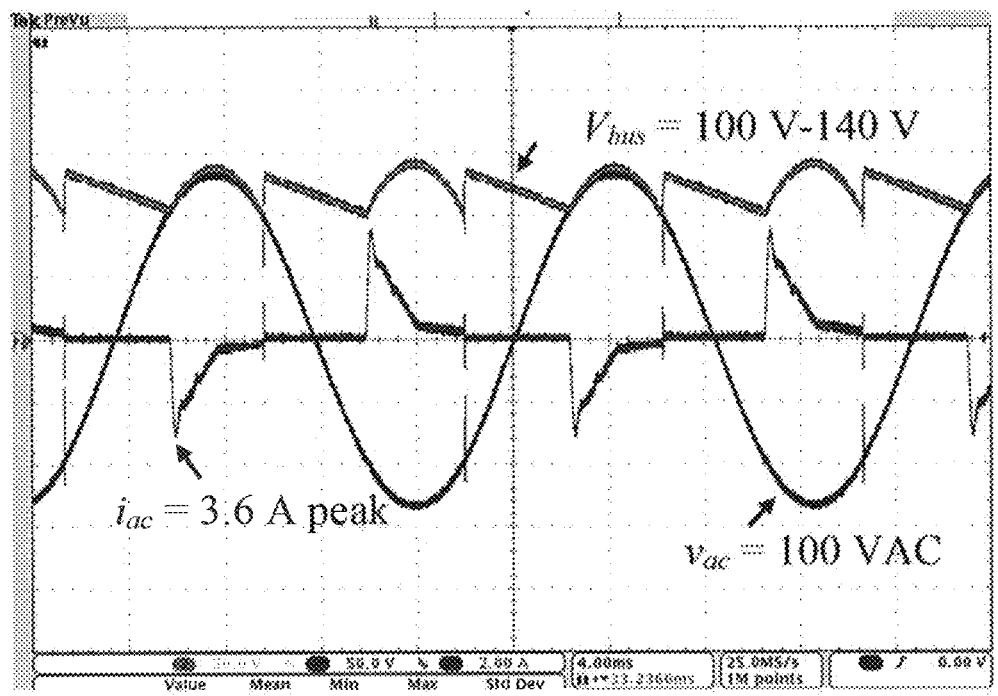
FIGS. 11 and 12 show performance of a prototype line power extension circuit operating at 60 W and 30 W loads, respectively.

FIG. 11 shows key waveforms under 100 VAC input and 60 W load power. The minimum value of $V_{bus}$ is controlled at 100 V. For a 60 W load, the peak AC current stress is 3.6 A.

Figure 12:
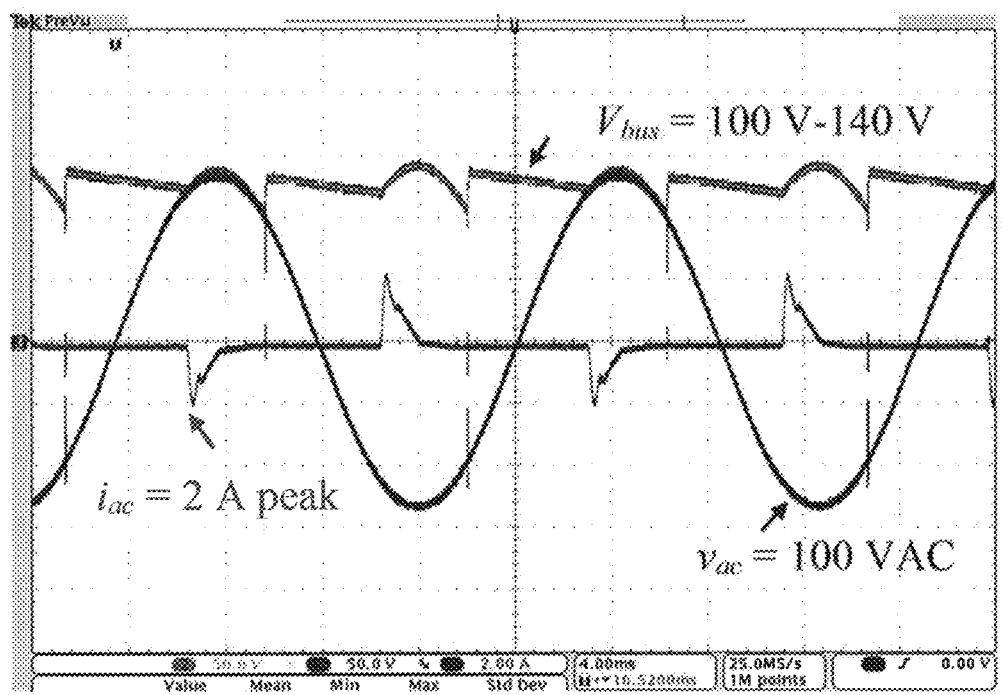

FIG. 12 shows key waveforms under 100 VAC input and 30 W load power. At this power level the minimum value of $V_{bus}$ is controlled at 100 V. It can be seen from the waveform of $V_{bus}$ that with a 30 W load, the voltage variation across $C_{in}$ is smaller than with a 60 W load (FIG. 11).

EQUIVALENTS

While the invention has been described with respect to illustrative embodiments thereof, it will be understood that various changes may be made to the embodiments without departing from the scope of the invention. Accordingly, the described embodiments are to be considered merely exemplary and the invention is not to be limited thereby.

The invention claimed is:

1. A power converter circuit, comprising:
   a rectifier circuit having first and second input terminals that receive an AC input voltage, and first and second output terminals that output a DC bus voltage;
   a series circuit connected across the first and second output terminals, the series circuit consisting of a switch and a capacitor, wherein a switch source terminal is connected to the first output terminal, a switch drain terminal is connected to a first terminal of the capacitor, and a second terminal of the capacitor is connected to the second output terminal;
   a controller that controls the switch so that the switch is turned on at an instant when a magnitude of the AC input voltage decreases to a selected DC bus voltage, and the switch is off during a period when the magnitude of the AC input voltage is greater than the selected DC bus voltage and less than a peak value of the AC input voltage;

wherein the DC bus voltage increases to a maximum magnitude of the AC input voltage at the instant the switch is turned on, and then decreases to the selected DC bus voltage.

2. The power converter circuit of claim 1, wherein the controller controls the switch so that the switch is turned off when a capacitor voltage reaches a peak value of the magnitude of the AC input voltage.

3. The power converter circuit of claim 1, wherein the controller controls the switch so that the switch is turned off at a selected time at or between a first instant when the magnitude of the AC input voltage is a peak value and a second instant when the magnitude of AC input voltage is equal to the DC bus voltage.

4. The power converter circuit of claim 1, wherein the controller controls the switch so that the switch is turned off when the magnitude of the AC line voltage decreases to a selected voltage lower than a peak value of the magnitude of the AC input voltage.

5. The power converter circuit of claim 1, wherein the rectifier circuit comprises a full bridge rectifier having four diodes.

6. The power converter circuit of claim 1, for use with a DC-DC converter selected from a flyback converter, a resonant converter, a Buck converter, a Buck-boost converter, and a forward converter.

7. The power converter circuit of claim 1, further comprising a DC-DC converter that receives the DC bus voltage and outputs a controlled DC voltage.

8. The power converter circuit of claim 7, wherein the DC-DC converter comprises a flyback converter, a resonant converter, a Buck converter, a Buck-boost converter, or a forward converter.

9. The power converter circuit of claim 7, wherein the DC-DC converter comprises a flyback converter or a resonant converter.

10. The power converter circuit of claim 1, wherein the power converter comprises a power adapter for a portable electronic device.

11. A method for implementing a power converter, comprising:
providing a rectifier circuit having first and second input terminals that receive an AC input voltage, and first and second output terminals that output a DC bus voltage;
connecting a series circuit across the first and second output terminals, the series circuit consisting of a switch and a capacitor, wherein a switch source terminal is connected to the first output terminal, a switch drain terminal is connected to a first terminal of the capacitor, and a second terminal of the capacitor is connected to the second output terminal;
controlling the switch so that the switch is turned on at an instant when a magnitude of the AC input voltage decrease to a selected DC bus voltage, and the switch is off during a period when the magnitude of the AC input voltage is greater than the selected DC bus voltage and less than a peak value of the AC input voltage;
wherein the DC bus voltage increases to a maximum magnitude of the AC input voltage at the instant the switch is turned on and then decreases to the selected DC bus voltage.

12. The method of claim 11, comprising controlling the switch so that the switch is turned off when a capacitor voltage reaches a peak value of the magnitude of the AC input voltage.

13. The method of claim 11, comprising controlling the switch so that the switch is turned off at a selected time at or between a first instant when the magnitude of the AC input voltage is a peak value and a second instant when the magnitude of AC input voltage is equal to the DC bus voltage.

14. The method of claim 11, comprising controlling the switch so that the switch is turned off when the magnitude of the AC line voltage decreases to a selected voltage lower than a peak value of the magnitude of the AC input voltage.

15. The method of claim 11, for use with a DC-DC converter selected from a flyback converter, a resonant converter, a Buck converter, a Buck-boost converter, and a forward converter.

16. The method of claim 11, further comprising using a DC-DC converter to receive the DC bus voltage and output a controlled DC voltage.

17. The method of claim 16, wherein the DC-DC converter comprises a flyback converter, a resonant converter, a Buck converter, a Buck-boost converter, or a forward converter.

18. The method of claim 16, wherein the DC-DC converter comprises a flyback converter or a resonant converter.

* * * * *